UNITED STATES PATENT OFFICE.

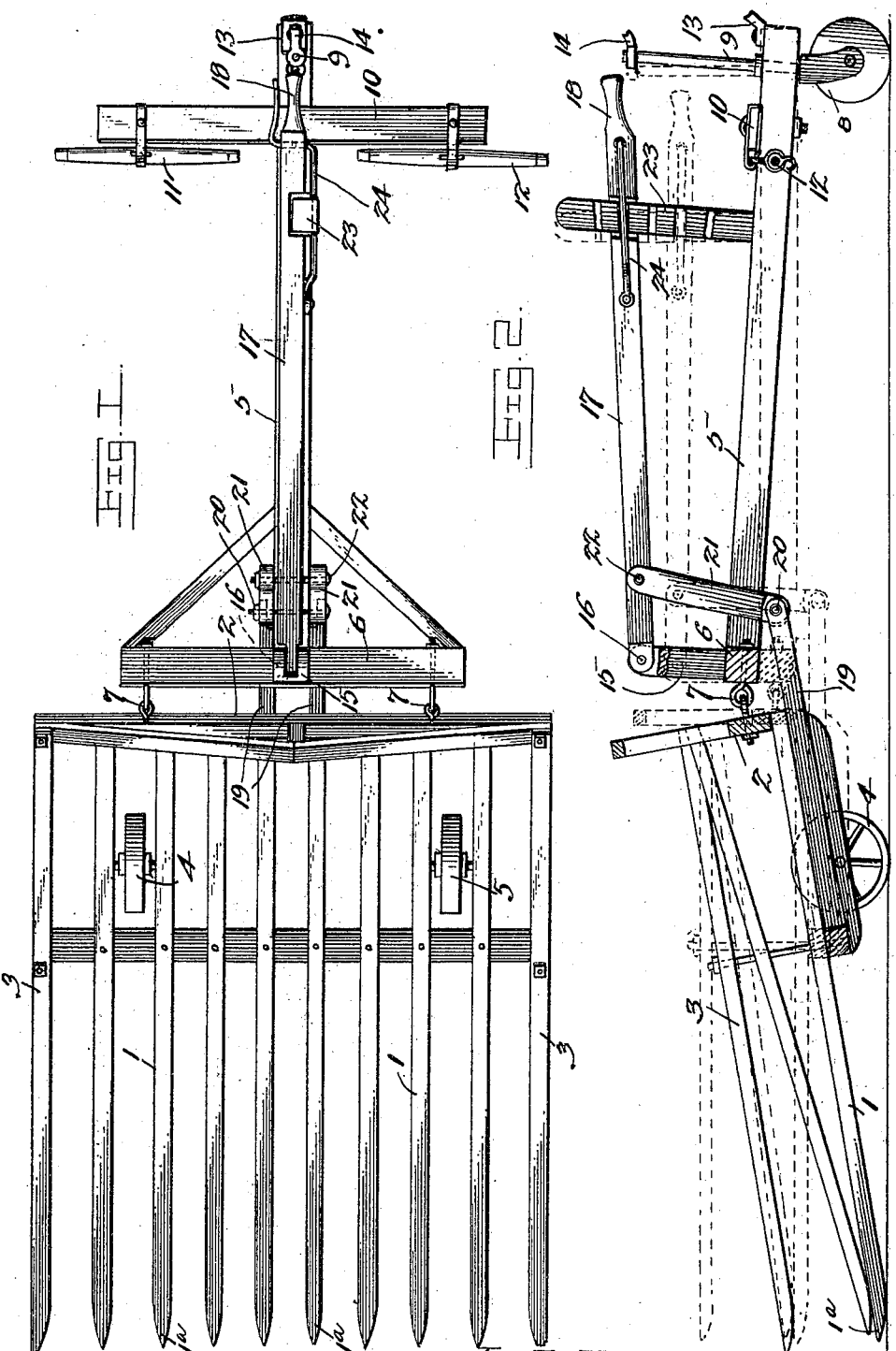

LAHIRA JONITHAN BARBER, OF EAGLEVILLE, CALIFORNIA.

HAY OR GRAIN GATHERER.

SPECIFICATION forming part of Letters Patent No. 684,904, dated October 22, 1901.

Application filed June 27, 1901. Serial No. 66,253. (No model.)

*To all whom it may concern:*

Be it known that I, LAHIRA JONITHAN BARBER, a citizen of the United States, residing at Eagleville, in the county of Modoc and State of California, have invented a new and useful Hay or Grain Gatherer, of which the following is a specification.

This device has for its object the production of an apparatus for gathering hay and loose cut grain; and it consists in the construction, combination, and arrangement of parts, as hereinafter shown and described, and specifically pointed out in the claims.

In the drawings, Figure 1 is a plan view. Fig. 2 is a longitudinal sectional elevation.

The gathering or raking portion of the apparatus consists of a series of teeth or rake-bars 1, connected to a head-framework 2, and with side bars 3, all connected in stationary relations. The gathering or raking portion is mounted upon bearing-wheels 4 5, intermediate of its length, so that the apparatus may be transported with the load partially in the rear of the axial line of the bearing-wheels and its front portion rendered easily adjustable vertically.

Attached flexibly to the rear of the raking portion of the apparatus, preferably to the head-framework 2, is a guiding and actuating framework, consisting of a tongue 5, having a cross-head 6, the latter connected to the head-framework 2 by links 7 above the plane of the axle of the bearing-wheels, whereby the natural tendency of the forward movement of the tongue is to depress the front ends of the teeth when the rake is in operation, and thus assist in keeping it in working position with relation to the ground. A steering-wheel 8 is pivotally connected to the outer or rear end of the tongue by a standard 9, as shown.

10 represents the doubletree, having the singletrees 11 12 connected to its ends and pivotally connected to the tongue 5 in the usual manner, so that the horses will travel in the rear of the rake or gatherer.

The driver's seat will be attached to the rear or outer end of the tongue, a portion of the standard 13 only of the seat being shown, as its construction is so well known.

An operating-lever 14 will be connected to the standard 9 of the steering-wheel and extended backward to a position convenient to the hand of the driver on the seat.

Rising from the forward end of the tongue 5 is a standard 15, and pivoted at 16 between ears at the top of this standard is a lever 17, extending rearwardly of the device and ending in a handle 18 within convenient reach of the driver on the seat. Extending rearwardly from the raking or gathering framework are one or more arms 19, connected pivotally at 20 by their rear ends to links 21, the upper ends of the links being pivotally united to the lever 17 at 22. By this arrangement by elevating and depressing the lever 17 the forward ends $1^a$ of the rake-bars 1 will be correspondingly adjusted to adapt the device to the ground over which it is operating as well as to elevate the gathering portion of the apparatus when loaded to place the "load" in position to be transported.

The lever 17 will be arranged to be held adjustably at any point of elevation by any approved means, such as a notched standard 23 and spring-pawl 24. Thus the machine is completely under the control of the driver from his seat both to steer the apparatus by the lever 14 and to adjust the gathering or raking portion by means of the lever 17.

The construction whereby the bearing-wheels 4 5 are placed intermediate of the gathering portion of the apparatus and extending the arms 19 rearwardly of the gathering portion is an important feature of the invention, as the load is thereby borne partially in the rear of the axial line of the bearing-wheels, so that the load is balanced and requires a much less force to elevate or otherwise adjust the raking portion, as will be readily understood.

By extending the arms 19 rearwardly the leverage of the operating mechanism is greatly increased, so that a small degree of force only will be required to actuate the lever 17. This is also an important feature of the invention and adds materially to the value and effectiveness of the apparatus.

The whole area of the raking and gathering portion comprised by the rake-bars 1, side guards 3, and rear or head frame 2 is by this arrangement left free and unobstructed for the load, thus greatly economizing in space and the material of the construction and provision made thereby for supporting a large portion of the load in the rear of the vertical plane of the supporting-axis of the bearing-wheels, whereby, as before stated, the load is more evenly balanced and much less force is required to elevate the front end when the load is complete. Another advantage gained by this construction is in the arrangement of the operating mechanism, whereby by pivotally uniting the end 6 of the tongue 5 close to the rear end 2 of the gatherer and rake and connecting the rake and gatherer to the rearwardly-extended bars 19 by the links 21 an increased leverage force is exerted to actuate the rake and gatherer, which, together with the partial balance of the load, as before described, provides an apparatus in which very little force is required to actuate it.

While I have described the preferred arrangement of seat and caster-wheel operating means, I do not desire to be limited thereto, as the seat may be arranged on and supported by the standard or spindle of the caster-wheel, it being well known that such a construction has been adopted in connection with other machines for this or analogous use.

What I claim as new is—

1. In a device of the class specified, a raking and gathering frame, supporting-wheels arranged on said frame at a point considerably in advance of the rear ends of the teeth of the frame, whereby a portion of the load will be borne rearwardly of the axial line of said wheels, a tongue, draft devices secured to the rear end of the same, means for flexibly uniting the forward end of the tongue to the rear end of the frame, a steering means at the rear end of the tongue, a lever pivoted at the forward end of the tongue and connected to said frame, said lever extending parallel with said tongue to a point near the rear end of the frame and being there provided with locking means, substantially as described.

2. In a device of the class specified, a raking and gathering frame, bearing-wheels supporting the same at a point considerably in advance of the rear ends of the teeth of the frame, whereby a portion of the load will be borne rearwardly of the axial line of said bearing-wheels, a tongue flexibly united at its forward end to the rear end of the gathering-frame, draft devices and steering mechanism provided at the rear end of said tongue, arms extended rearwardly from the frame at a point under the connection of the tongue and frame, a standard at the forward end of the tongue, an operating-lever pivoted thereto and extending parallel with said tongue to a point near the rear end thereof and being there provided with locking means, and links connecting said lever to said rearwardly-extending arms, whereby said tongue and gathering-frame may be mutually adjusted, substantially as described.

3. In a hay and grain raker and gatherer, a rake-frame intermediately supported whereby the frame is partially balanced and the load borne partially in front and partially in the rear of said support, a draft-frame supported at its rear end and connected to said rake-frame in the rear of said support above the plane of the axial line of said support, a lever pivotally connected to the forward end of said draft-frame, and one or more links pivotally connecting said lever in the rear of said pivotal point thereof to the rear of said rake-frame, substantially as described.

In testimony that I claim the foregoing as my own I have hereto affixed my signature in the presence of two witnesses.

LAHIRA JONITHAN BARBER.

Witnesses:
SAMUEL T. KISTLER,
JOHN TELFER.